United States Patent [19]

Hardcastle

[11] 4,137,946
[45] Feb. 6, 1979

[54] PRESSURE VESSEL NUT AND LOCK SCREW ARRANGEMENT

[75] Inventor: Philip P. Hardcastle, Houston, Tex.

[73] Assignee: Equipment Renewal Company, Houston, Tex.

[21] Appl. No.: 856,495

[22] Filed: Dec. 1, 1977

Related U.S. Application Data

[63] Continuation of Ser. No. 768,276, Feb. 14, 1977, abandoned.

[51] Int. Cl.² ........................................... F16L 55/00
[52] U.S. Cl. ................................................. 138/103
[58] Field of Search ..................... 138/108, 103, 89; 277/110; 220/323, 325, 327

[56] References Cited

U.S. PATENT DOCUMENTS

| | | | |
|---|---|---|---|
| 1,511,529 | 10/1924 | Standlee | 277/129 |
| 1,720,346 | 7/1929 | Pew | 277/110 |
| 2,029,202 | 1/1936 | Shepherd | 277/110 |
| 2,902,302 | 9/1959 | Ackermann | 277/110 |
| 3,239,247 | 3/1966 | Pickert | 277/110 |

Primary Examiner—Richard E. Aegerter
Assistant Examiner—L. Footland
Attorney, Agent, or Firm—Jack W. Hayden

[57] ABSTRACT

A lock screw arrangement for a lateral passage which intersects the longitudinal bore of a pressure vessel, wherein the lateral passage includes a first shoulder facing toward, a second shoulder facing away from the bore, includes a shaft for extending through the lateral passage with threads intermediate the inner and outer shaft ends. The inner shaft end is formed to provide a surface for engaging a member to retain it in the bore and an annular shoulder facing the first shoulder within the lateral passage. Packing abuts the second shoulder and surrounds the shaft. A nut is externally threaded for engaging with threads in the internal passage, and internal threads for engaging with the threads on the shaft whereby the nut may be engaged against the packing to seal between the passage and shaft.

Seal means are carried by the nut for engaging adjacent the outer shaft end to isolate the internal nut threads and shaft threads from the environment and from internal pressure in the vessel. The outer shaft end is provided with surface means whereby the shaft can be rotated to sealingly abut the annular shaft shoulder with the shoulder in the bore to seal off between the bore and passage so that the nut can be removed for replacing the packing in the presence of pressure in the vessel.

3 Claims, 2 Drawing Figures

4,137,946

PRESSURE VESSEL NUT AND LOCK SCREW ARRANGEMENT

CROSS REFERENCE TO RELATED APPLICATION

This application is a continuation of my prior copending application Ser. No. 768,276 filed Feb. 14, 1977 for "Lock Screw for Tubing Head now abandoned."

SUMMARY OF THE INVENTION

A tubing or casing head is supported at the earth's surface above a well bore in a well known manner. It is desirable to support tubing in the tubing or casing head so that it extends downwardly into the well bore. A device commonly termed a tubing hanger is employed which is seated within the longitudinal bore of the tubing or casing head and is provided with seal means for sealably engaging therewith. The tubing hanger is configured to receive and support tubing therein, and it is desirable to retain the tubing hanger in sealed and seated position within the head. Lock screws heretofore used for such purpose have been threadedly secured in a lateral opening in the tubing head with the threads which engage the lock screw in the opening positioned immediately adjacent the head that engages the tubing hanger. Such threads are exposed to the fluids in the tubing head above the tubing hanger and to the atmosphere and over an extended period of use may become galled rendering the lock screw difficult if not impossible to remove from the tubing hanger.

It is also difficult to change the seals surrounding the lock screw in the field as there is no practical arrangement for sealing off the lateral opening from the bore while the seals are replaced with pressure in the bore.

The same general problems are present in a pressure vessel with a longitudinal bore and lateral passages intersecting the bore for receiving a securing arrangement for a member to position a member in the vessel bore.

The present invention overcomes this problem in that it provides a lock screw that is constructed and arranged so that the threads which are associated therewith are sealed from the fluids in the pressure vessel, such as by way of example, a tubing or casing head and are sealed off from atmosphere thus preventing fluid contact therewith and inhibiting galling of the threads or other damage thereto by reason of fluid contact and which enables the lock screw to be more readily disengaged from the member in the longitudinal bore of the head.

Yet another object of the present invention is to provide a lock screw arrangement for positioning in a lateral opening in a pressure vessel to retain a member in the longitudinal bore of the vessel including an elongated shaft with threads intermediate the inner and outer shaft ends. The inner shaft end is provided with a surface for engaging the member to be retained and an annular shoulder with the lateral passage. An annular surface extends longitudinally on the shaft which is smaller in diameter than the lateral opening in the vessel to form an annular space for receiving packing which seats on a shoulder in the passage facing outwardly from the bore. A packing nut has external threads for threadedly engaging with threads in the lateral opening of the vessel and is provided with a longitudinal bore through which the shaft is extended. Internal threads formed on the bore of the packing nut engage the threads on the shaft to enable the lock screw and nut to be moved independently of each other whereby the nut abuts the packing to seal between the passage and shaft and the shaft can be moved into and out of engagement with a member in the vessel bore. The outer end of the shaft is formed with surface means to enable the shaft to be rotated into and out of locking engagement with a member in the longitudinal vessel bore and seal means are carried by the nut to engage the shaft adjacent its outer end to seal off the internal nut threads and external shaft threads from the atmosphere.

The shaft may be rotated to engage its annular shoulder with a shoulder in the lateral passage facing toward the longitudinal bore to form a seal to retain pressure in the vessel or head so that the packing nut can then be removed for access to the packing for replacement thereof.

Other objects and advantages of the present invention will become more readily apparent from a consideration of the following description and drawings.

PREFERRED EMBODIMENT OF THE PRESENT INVENTION

The present invention will be described in detail as it is employed in a casing or tubing head, by way of example only. However, it may be employed in any pressure vessel having a longitudinal bore for receiving and seating a member, with lateral passages to receive the lock screw arrangement of the present invention to engage and retain the member in the vessel bore.

Figure 1:
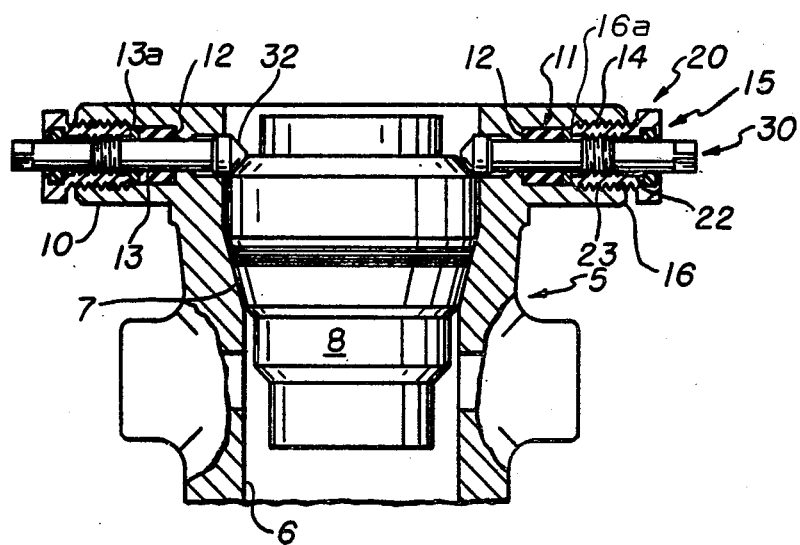
FIG. 1 is a vertical sectional view of a tubing head forming a pressure vessel with a tubing hanger therein and the lock screws of the present invention engaged with the tubing hanger to retain it in seated and sealed position within the tubing head.

Attention is first directed to FIG. 1 of the drawings wherein a tubing head is referred to generally by the numeral 5. The tubing head forms a pressure vessel and is provided with a bore 6 extending longitudinally thereof having a tapered annular shoulder 7 formed therein for receiving and seating the tubing hanger 8 thereon. The tubing hanger is provided for supporting tubing (not shown) in a manner well known so that the tubing may extend into a well bore in the earth's surface. The tubing hanger 8 is provided with an annular seal that seats on shoulder 7. It is necessary to retain the tubing hanger or member 8 in seated and sealed position within the vessel 5 and the lock screws referred to generally at 15 are employed for such purpose.

The vessel, tubing or casing head 5 includes an annular flange 10 at the one end thereof. The annular flange 10 is provided with a plurality of circumferentially spaced lateral openings 11 that intersect the longitudinal bore 6 of the vessel or head 5 as illustrated in FIG. 1 of the drawings. A first shoulder 12a facing toward the bore 6 and second shoulder 12 is provided in lateral openings 11. The shoulders 12 and 12a are spaced longitudinally as shown and are formed intermediate the ends of the lateral opening 11. It will be noted that the first shoulder 12a and second shoulder 12 are preferably adjacent but spaced from the intersection of the lateral openings 11 with the longitudinal bore 6. A threaded surface 14 is provided in each of the lateral openings 11 extending from the outer end 16 thereof to a point 16a spaced from shoulder 12 which defines an annular portion 11b between the end 16 of the threads and shoulder 12 in each passage 11.

The lock screw arrangement referred to generally at 15 includes an enlongated shaft referred to generally at 30 which is provided with threads 36 intermediate its inner end 31 and outer end 38.

The inner end 31 of the elongated shaft 30 is formed so that when it projects into the longitudinal bore 6 of the head or vessel 5, the annular tapered surface 32 abuts and retains the member 8 in position on the shoulder 7 as shown in FIG. 1 of the drawings. A shoulder 12b is formed on shaft 30 and is positioned within the lateral passage 11 between the bore 6 and shoulder 12a as shown. The shoulder 12b and shoulder 12a are shaped so that when they abut, they form a seal, as will be described. Extending from the shoulder 12b is a smooth annular surface 35 on the shaft 30 which is interrupted by the threaded portion 36 formed on the shaft 30 spaced between the shaft ends 31 and 38 as shown in the drawings.

Packing means 13 abuts the second shoulder 12 and sealably engages in the portion 11b of lateral opening 11 and also sealably engages with the annular surface 35 on the elongated shaft 30 between the shoulder 12 and threads 36 as shown.

The packing nut 20 includes external threads 23 for engaging with the threads 14 in lateral passages 11 and longitudinal bore 22 of the nut 22 includes threads 22a for engaging with the threads 36 on the elongated shaft 30 so that it can be positioned to abut and retain packing 13 in position, which also enables the shaft 30 to be moved independently of the nut 20.

The packing nut 20 includes annular seal means 22b which sealably engages the portion 37 of the shaft 30 as shown in the drawings.

Figure 2:
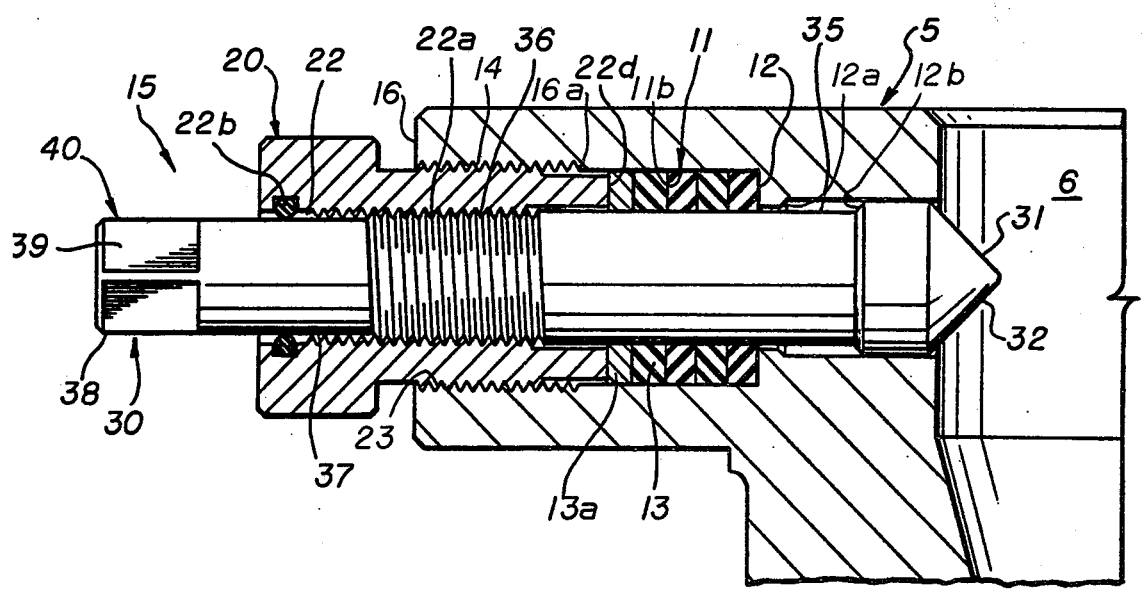
FIG. 2 is an enlarged partial sectional view illustrating the details of the lock screw arrangement of the present invention.

It can be seen from the foregoing description that the threads 36 on the elongated shaft 30 and threads 22a on packing nut 20 are protected from exposure to the longitudinal bore 6 and the fluids therein by reason of the packing 13 positioned between the end 22d of the packing nut 20 and the shoulder 12 in the lateral openings 11. Also, these threads are protected from the atmosphere or environment by the seal 22b carried by nut 22. The packing nut 20 may be rotated as desired to position or abut seat means 13 for forming the seal between the lateral opening 11 and the annular surface 35 on shaft 30. If desired a metal back up ring 13a may be employed between the end 22d of the packing 20 and the seal means 13 as shown in greater detail in FIG. 2 of the drawings.

Since the threads 36 are not exposed to the action of the fluid in the longitudinal bore 6 or to the environment, the elongated shaft 30 may readily be rotated for disengagement from the member 8 within the longitudinal bore 6 even though the shaft 30 may have been positioned to abut member 8 over an extended period of time.

It is to be noted that the length of the annular surface 35 including the portion thereof 37 is such that a seal is maintained between shaft 30 and the seal means or packing 13 and between seal means 22b and shaft 30 even though substantial relative longitudinal movement may occur between the shaft 30 and packing nut 20.

The other or outermost end 38 of the shaft 30 extends from the packing nut 20 and is provided with surface means referred to at 40 such as in the form of a non circular surface means 39 whereby the elongated shaft 30 may be engaged manually, or with a wrench, hand wheel or other tool for rotating the shaft 30 to position the head 31 as desired in relation to the member 8 to be secured within the vessel or tubing head 5.

If it is desired to inspect nut 20 and packing 13 or to replace them, the shaft 30 may be rotated so as to engage annular shoulder 12b on shaft 30 with annular shoulder 12a in passage 11. This forms a seal to prevent the escape of fluid pressure from bore 6 thru passage 11, and packing nut 20 can then be removed for field inspection and replacement of packing 13.

As noted, a plurality of passages 11 are provided in each vessel, and the packing in each may be replaced by retracting the shaft means 30 one at a time to sealingly engage shoulders 12a and 12b. After the packing 13 is replaced in one lateral passage 11, shaft 30 is then rotated to reengage end portion 32 with member 8, whereupon the packing in the next passage 11 may be inspected and replaced if necessary in a like manner. It is preferred that the same pitch be employed on threads 22a, 14 and 36.

The foregoing disclosure and description of the invention are illustrative and explanatory thereof, and various changes in the size, shape, and materials as well as in the details of the illustrated construction may be made without departing from the spirit of the invention.

What is claimed is:

1. In a pressure vessel having a longitudinal bore intersecting at least one lateral passage which has a first shoulder facing inwardly toward the bore and a second shoulder facing outwardly away from the bore, the invention comprising an arrangement in the passage to retain a member within the bore including:
   a. an elongated shaft for extending through the passage and having threads intermediate its inner and outer ends;
   b. said inner end of said shaft being formed to provide a surface for engaging the member in the vessel bore and an annular shoulder within the lateral passage;
   c. packing abutting the outwardly facing second shoulder of the passage for sealing between said shaft and the passage; and
   d. a nut having external threads for engaging threads on the passage and internal threads for engaging said threads on said shaft whereby said nut may be moved against said packing to form a seal between said shaft and the passage.

2. The invention of claim 1 wherein said nut is provided with seal means for sealably engaging adjacent said outer shaft end to protect said internal nut threads and said shaft threads from the environment.

3. The invention of claim 1 including surface means on said outer shaft end whereby said shaft may be rotated within said nut to sealably engage said annular shaft shoulder and said inwardly facing passage shoulder whereupon said nut may be disengaged from the passage.

* * * * *